United States Patent
Helms et al.

(10) Patent No.: US 9,032,363 B2
(45) Date of Patent: May 12, 2015

(54) PROVIDING A USER INTERFACE LIBRARY FOR BUILDING WEB-BASED APPLICATIONS

(71) Applicant: Red Hat, Inc., Raleigh, NC (US)

(72) Inventors: Eric D. Helms, Raleigh, NC (US); Jaromir Coufal, Olomouc (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/969,832

(22) Filed: Aug. 19, 2013

(65) Prior Publication Data

US 2015/0052496 A1    Feb. 19, 2015

(51) Int. Cl.
*G06F 9/44*    (2006.01)

(52) U.S. Cl.
CPC .................................... *G06F 8/34* (2013.01)

(58) Field of Classification Search
USPC .............. 717/107–111, 120–121, 168–174; 709/203
IPC ................ G06F 8/20,8/34, 17/3089, 8/36, 8/60, G06F 8/70
See application file for complete search history.

(56) References Cited

U.S. PATENT DOCUMENTS

| | | | |
|---|---|---|---|
| 6,216,175 B1 * | 4/2001 | Sliger et al. ................. | 717/169 |
| 6,314,559 B1 * | 11/2001 | Sollich .......................... | 717/111 |
| 6,449,764 B1 * | 9/2002 | Sliger et al. ................. | 717/170 |
| 6,920,630 B2 * | 7/2005 | Jackson ........................ | 717/168 |
| 7,519,946 B2 * | 4/2009 | Celi et al. .................... | 717/109 |
| 7,565,640 B2 * | 7/2009 | Shukla et al. ................ | 717/105 |
| 7,614,052 B2 * | 11/2009 | Wei ............................... | 717/176 |
| 8,046,737 B2 * | 10/2011 | Wittenberg et al. .......... | 717/109 |
| 8,255,280 B1 * | 8/2012 | Kay et al. ..................... | 705/26.1 |
| 8,307,331 B2 * | 11/2012 | Warila et al. ................. | 717/109 |
| 8,352,913 B2 * | 1/2013 | Sakhare et al. .............. | 717/120 |
| 8,387,004 B2 * | 2/2013 | Beckman et al. ............. | 717/109 |
| 8,473,899 B2 * | 6/2013 | Centonze et al. ............ | 717/108 |
| 8,504,982 B2 * | 8/2013 | Joe et al. ....................... | 717/107 |
| 8,522,203 B1 * | 8/2013 | Tibbett et al. ................ | 717/115 |
| 8,566,789 B2 * | 10/2013 | Siddaramappa et al. ..... | 717/110 |
| 8,656,362 B2 * | 2/2014 | Balasubramanian ......... | 717/125 |

(Continued)

FOREIGN PATENT DOCUMENTS

| | | |
|---|---|---|
| EP | 1914652 A1 | 4/2008 |
| WO | WO 2010135532 | 11/2010 |

OTHER PUBLICATIONS

Holmes et al, "Integrating Web Service and Grid Enabling Technologies to Provide Desktop Access to High-Performance Cluster-Based Components for Large-Scale Data Services" IEEE, pp. 1-8, 2003.*

(Continued)

*Primary Examiner* — Anil Khatri
(74) *Attorney, Agent, or Firm* — Lowenstein Sandler LLP

(57) ABSTRACT

A method and system for providing an interactive developer guide for guiding a user through a web-based application component selection process for a web-based application. The component selection process includes providing a component list including a plurality of configurable web-based application components, prompting the user to select a web-based application component from the list, and receiving a selection of a web-based application component from the list. The selected web-based application component is provided along with a snippet of code for integrating the selected web-based application component into the web-based application.

17 Claims, 12 Drawing Sheets

(56) References Cited

U.S. PATENT DOCUMENTS

| | | | |
|---|---|---|---|
| 8,732,660 B2 * | 5/2014 | Neill et al. | 717/110 |
| 8,881,129 B1 * | 11/2014 | McKinnon et al. | 717/168 |
| 2008/0082959 A1 | 4/2008 | Fowler | |
| 2008/0229278 A1 | 9/2008 | Liu et al. | |
| 2011/0066934 A1 | 3/2011 | Treisman et al. | |

OTHER PUBLICATIONS

Galenson et al, "CodeHint: Dynamic and Interactive Synthesis of Code Snippets", ACM, pp. 653-663, 2014.*

Wightman et al, "SnipMatch: Using Source Code Context to Enhance Snippet Retrieval and Parameterization", ACM, pp. 219-228, 2012.*

Subramanian et al, "Making Sense of Online Code Snippets", IEEE, pp. 85-88, 2013.*

Microsoft Developer Network "Walkthrough: Using HTMP Snippets"; retrieved from http://msdn.microsoft.com/en-in/library/dd985242(v=vs.100).aspx on Aug. 28, 2013.

Hoang, et al. "An Analysis of Spreadsheet-Based Services Mashup", Proc. 21st Australasian Database Conference (ADC 2010), Brisbane, Australia, pp. 141-149.

Google "Sites > Help", retrieved from http://support.google.com/sites/?hl=en on Aug. 28, 2013.

Stuart, Michael et al. "Building Applications for Mobile Devices" Jan. 22, 2003, retrieved from http://www.bandgap.cs.rice.edu/classes/comp410/resources/Michael%20Stuart%20and%20Chris%20Wafer%20lectures/RiceLectures/Building_Applications_for_Mobile_Devices.htm on Aug. 30, 2013.

* cited by examiner

470

PROVIDING A USER INTERFACE LIBRARY FOR BUILDING WEB-BASED APPLICATIONS

FIELD

Embodiments of the present disclosure relate to building web-based applications and, more particularly, to a user interface library for building web-based applications.

BACKGROUND

Web-based applications can be built to provide various functionalities that work together as system or project, such as content management systems, database management systems, configuration and provisioning management systems, and cloud provider management systems. It is often convenient and helpful for the various functionalities to have a similar look and feel for the user, as well as having similar usability, so that the user has a unified experience. However, building a web-based application can be a challenging task for a developer because a web-based application can include many components to implement these various functionalities. In addition, the different functionalities are often developed by different developers or different teams of developers. Even though the different functionalities may employ similar types of components, different developers may write code that implements these components in different fashions. As a result, the look and feel, and usability, for the user is often different from one functionality of the system or project to another.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Figure 1:
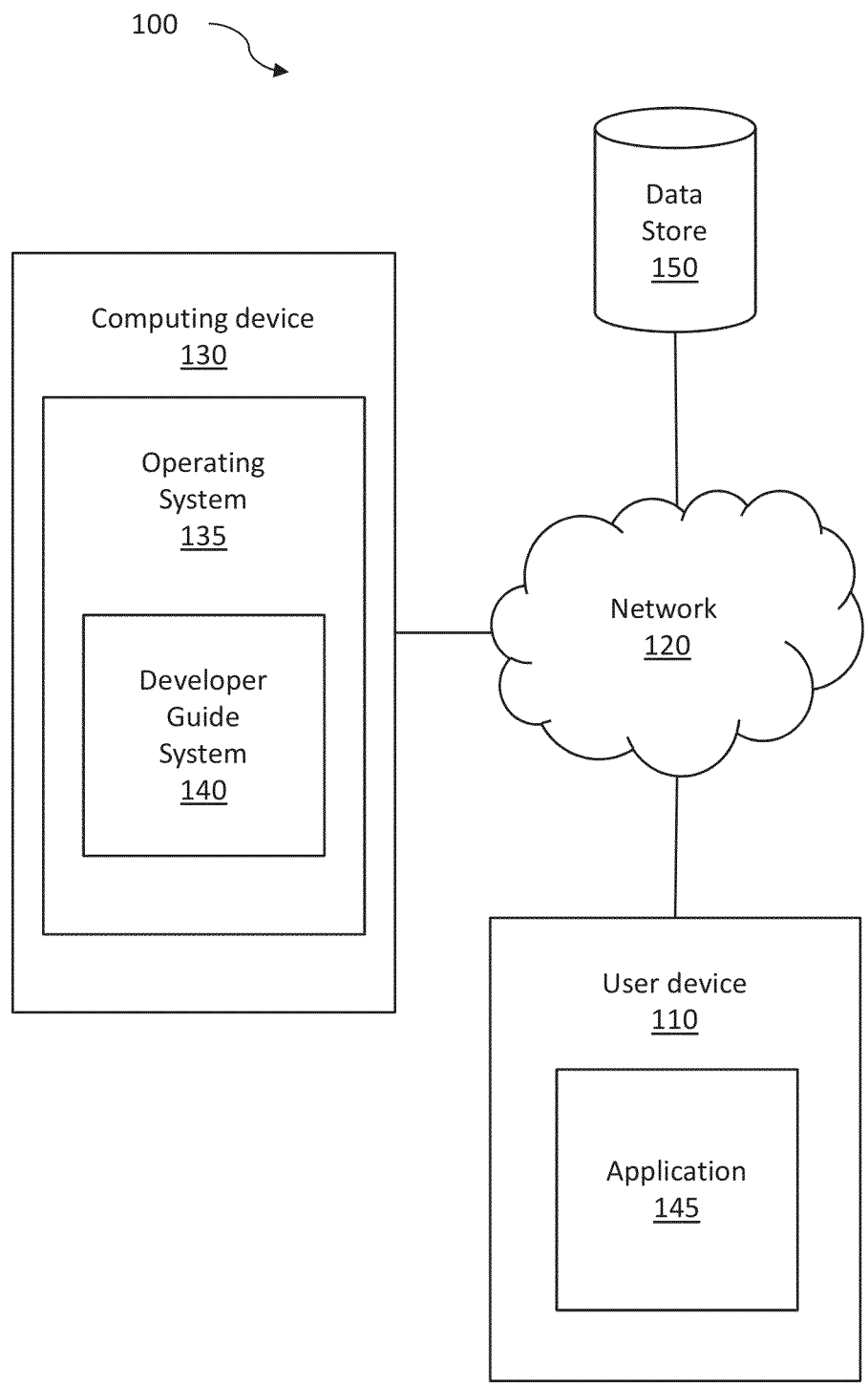
FIG. 1 illustrates exemplary system architecture, in accordance with various embodiments of the present disclosure.

Embodiments of the disclosure are directed to a method and system for providing an interactive developer guide for guiding a user through a web-based application component selection process for building a web-based application. The component selection process includes providing a component list including configurable web-based application components, prompting the user to select a configurable web-based application component from the list, and receiving a selection of the web-based application component from the list. The selected web-based application component and a snippet of code for integrating the selected web-based application component into the web-based application are then provided to the user.

Embodiments provide a solution for developers to ease development of applications (e.g., web-based applications such as information software, systems management software, or cloud management software) with a set of components for providing a common appearance and usability pattern that would be available and usable for different functions and in multiple applications. In one embodiment, reference designs are available for different development teams participating in a particular application development project. In other words, there is a central deposit (e.g., a library) of components for developers from each team to use in the development of their portion of the project. As a result, the functionality of projects with multiple views or multiple related projects are better unified.

Unlike approaches utilizing user interface frameworks or front end frameworks, which can achieve a certain level of commonality by focusing merely on the look and feel of an application rather than the functioning of the application, embodiments herein can provide a certain user experience by employing unified functionality across a particular product or across multiple related products.

In one embodiment, stand-alone components for common UI interactions are provided, which can reduce duplication of work, provide configurable and progressively enhanced components, and provide unique and customizable styling. Further, the components can be tested for cross-browser use to improve reliability and provide a method to build upon proven, tested libraries. For example, the components can act as building blocks to build more complex components to accomplish more complicated tasks. Component developers can use the components to create larger patterns and interactions or users can use the components to build out their own larger patterns with a common interaction set.

In one embodiment, the components can be used in Ruby on Rails applications. The components can be deliverable via a gem and can be built as a Rails Engine for asset delivery. For example, since the components can be built using native languages of web communication (e.g., JAVA SCRIPT®, CSS, and HTML), multiple web server frameworks and languages can utilize the components, such as Ruby on Rails, JAVA®, Python, and C#.

FIG. 1 shows a block diagram of a system architecture 100 according to one embodiment. In one embodiment, a computing device 130, such as a personal computer, a laptop computer, a cellular telephone, a personal digital assistant (PDA), etc., includes an operating system 135 having a developer guide system 140 for facilitating development of an application 145, such as a web-based application or other type of application, on a user device 110. The computing device 130 may be part of an organization's network. The computing device 130 is coupled to the user device 110 and a data store 150 via a network 120, which may be may be a private network (e.g., a local area network (LAN), a wide area network (WAN), intranet, or other similar private networks) or a public network (e.g., the Internet). In one embodiment, the data store 150 and the user device 110 are coupled directly to the computing device 130.

The developer guide system 140 can be a module of the operating system (OS) 105, which provides a user with an interactive guide that guides a user (e.g., a developer) through a list (or library) of components (e.g., web-based application components) that are available for the user to employ in the development of the application 145.

The data store 150 includes the list of components available for the user to select from and snippets of code (e.g., a list or library of snippets of code) that the user can choose from for integrating the selected component into the application 145 and/or customizing the selected component for a particular application.

The user can utilize the user device 110 to perform the selection of the component from the library, and the user device 110 can be a terminal, a personal computer, a laptop computer, a cellular telephone, a personal digital assistant (PDA), etc. In one embodiment, the user device 110 can be a processing device that is a client of the computing device 130, which is functioning as a server.

Initially, a user can identify some functionality or need that is desired to be met. For example, this functionality could be providing a login page, providing a sorting function, providing an error message function, etc. Also, the user can desire that this functionality be consistent with other parts of an application development project with respect to usability pattern, functioning, look, and feel. The user can use the user device 110 to access the developer guide system 140 on the computing device 130 to select and locate a desired component, e.g., a login page component. The user may also be able to access documentation details regarding the component and/or snippets of code for integrating and/or customizing the component.

The user can then import the selected component into the context of the application 145 and integrate integration points between the user's project and the component. The user can also add customization or configuration (e.g., color, logo, branding features, etc.). Once the component is integrated and customized to the user's satisfaction, the component can provide the desired functionality in the application 145.

Figure 2:
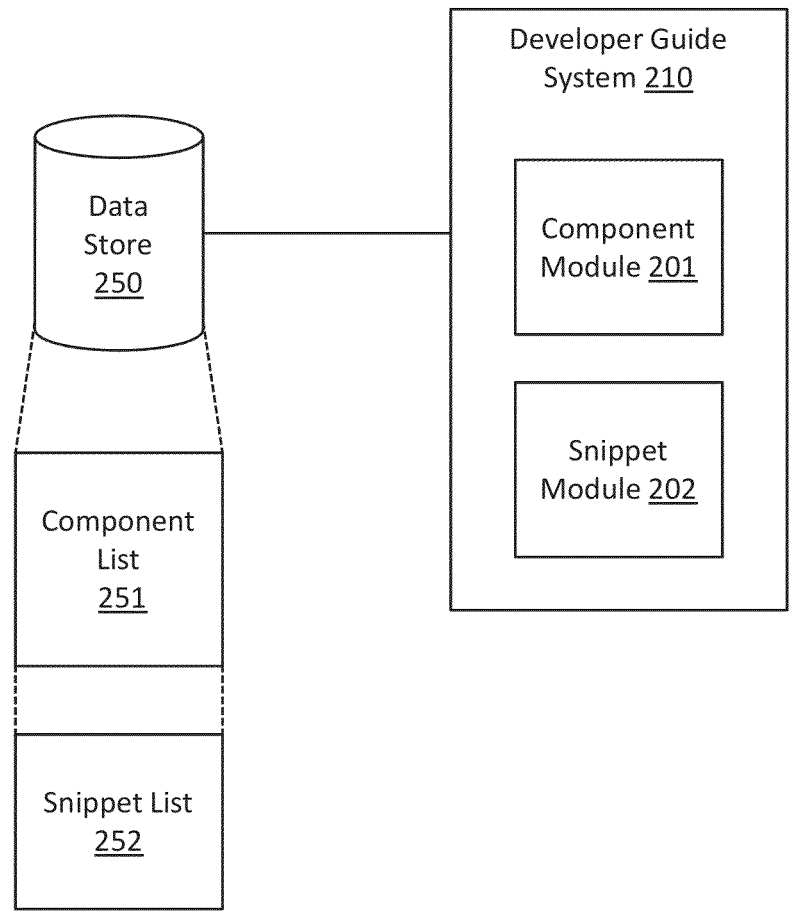
FIG. 2 illustrates a block diagram of an embodiment of a developer guide system and a component data store.

FIG. 2 illustrates a developer guide system 210 and a data store 250 according to one embodiment. Here, the developer guide system 210 can be the same as the developer guide system 140 of FIG. 1, and the data store 250 can be the same as the data store 150 of FIG. 1. The developer guide system 210 includes a component module 201 and a snippet module 203. Note that in alternative embodiments, the developer guide system 210 may include more or less modules than those shown in FIG. 2. Also, the component module 201 and snippet module 203 may be combined into a single module. Additionally, the functionality of either the component module 201 or the snippet module 203 may be divided between multiple modules.

In one embodiment, the component module 201 provides the user with a list (e.g., a library) of web-based application components from a component list 251 stored in the data store 250. The list of components can be organized in various methods including alphabetically, grouped by function, grouped by application type, etc. The list of components can include both components that accomplish simple functions (e.g., enhancing a browser), such as providing a button, and components that accomplish more complex functions, such as providing navigation for a table or managing a large data set, that can be based on multiple simpler components.

Examples of functionalities for the web-based application components include, but is not limited to, buttons, context menus, dropdowns, toolbars, filterbars, headers, navigation, tables, forms, flash messages, sort by, and two-pane navigation.

For example, button components can provide: web buttons with hover and click visualization; various predefined sized buttons; predefined primary buttons (e.g., a color which is set in the library as primary); warning button visualization (e.g., highlighted on hover); button states (e.g., disabled or processing); button groups (e.g., non-breakable groups); and icon buttons. The button components can provide the same look for the various buttons, but the buttons can perform different functions.

In another example, context menu components can provide sub-menu functionality (e.g., drill down); pull-right/left menus; pull-bottom/top menus; and divider menus.

In yet another example, dropdown components can provide a combination of button and context menu components, providing functionality including button (or other object) selection causing a context menu to appear.

In an additional example, toolbar components can provide functionality of setting of left/right aligned buttons and button groups; dividers; spacers; buttons breaking to next line on window resize; and horizontal/vertical alignment.

In a further example, filter bar components can provide functionality including setting of on/off buttons (e.g., links to apply a filter or not); visualization of states (e.g., on, off, or hover); breaking to a next line if window is made smaller; and hiding an extra set of filters under a dropdown "see more" (e.g., to conserve display space). A list of various different filters can be provided, and hovering over the filter can provide different visualization.

In another example, header components can provide functionality including a combination of horizontal navigation along with a top bar including a logo and a user menu.

In yet another example, navigation components can provide functionality including horizontal or vertical navigation; combinations of multiple dropdowns; and the ability to drill down into deeper levels. For example, first level items can be shown on the left, and, when a section is activated, the first level is expanded to show the second level. Breadcrumbs can also be provided to track location or level.

In a further example, table components can provide functionality including filtering within a context; checking rows (e.g., bulk actions); inline editing; highlighting on hover; indicating selected or displayed rows; and infinite scrolling for large data sets.

In an additional example, forms components can provide functionality including multiple helping options (e.g., help label, notes under input, and hints next at input); an indicator of required fields; various input type support (e.g., text, number, date, e-mail, password, data range, select, checkbox, etc.); layout options (e.g., labels at top of input, hints at bottom of input, or a combination of both); and various input states (e.g., read-only, disabled, warning, success, and error). Previews of the display can also be provided. Hints for filling in a form can be provided, as well as setting character length. Further, substantially all of the table can responsive, e.g., the table adapting when table size is changed. The position of labels and messages can be adjusted, and input boxes can be disabled or read only.

In another example, flash message components can provide functionality including messages which indicate status of performed actions (e.g. form validation, success, warning, error, etc.).

In a yet another example, sort by components can provide functionality including special interaction with a dropdown; and sorting for each column or row of a data set (e.g., ascending or descending).

In a further example, two-pane navigation can provide functionality including providing a list view in a first pane with selection for bulk actions, customizable icons for items, and filtering/searching; and providing a detail view in a second pane showing detail of selected item from the first pane.

Below is one example of a form component with functionality including a layout, a fieldset, required fields, informative text, read-only fields, disabled fields, label help, placeholders, notes, hints, validation messages, form buttons, and combining features.

```
<form class='form'>
    <div class='control_group'>
        <div class='label'>
            <label for='input_id'>Label</label>
        </div>
        <div class='input'>
            <input id='input_id' type='input_type'>
        </div>
    </div>
    <div class='control_group'>
    ...
    </div>
</form>
```

In one embodiment, the user can have access to an entire library of components, or the user can pick and choose particular components.

Once the user has selected a component from the component list 251, the component module 201 receives the selection from the user, retrieves the selected component from the component list 251, and provides the selected component to the user. The user is then able to import the selected component into the application.

Next, the snippet module 202 of the developer guide system 210 provides the user with a snippet of code from the snippet list 252 so that the user can use the snippet to effectively integrate the component into the application.

In one embodiment, the snippet module 202 provides a snippet list to the user. The snippet list can include different snippets of code for integrating the component into the application. The snippet module 202 can then prompt the user to select a snippet of code from the snippet list. Here, the user is able to choose the snippet of code best suited for the particular application that will be using the component. Once the user has selected a snippet of code, the snippet module receives the selection of the snippet of code, and then provides the selected snippet of code to the user.

For example, different snippets of code may be required for integration of the component into applications for different web-browsers. In another example, different snippets of code may be required for integration of the component into different parts of the application because data from different sources is being used.

The selected snippet of code can be used to integrate the component into the application. In one embodiment, a set of predefined variables are provided that can be easily overridden to customize the component for the particular application. In one example of customization, stylesheet partials can be created for use in customization.

The components can provide enhancements in commonality to features and functionality that are part of the base browser experience, and also high level patterns of interaction with a master detail pattern, such as a component that mixes a data table with viewing details of each item in the table within the table, selecting the number of columns shown, searching, and sorting. With a library of components, a common interaction can be provided each time a large data set is encountered, which will ease use and lower overhead for the user and ease development for the developers because the components did not have to be built. The developers can instead focus on the data of interest. By providing simple function components that can be combined to accomplish more complex tasks, the user experience can be customized, e.g., for particular data configurations. In one example, the user experience can be customized for each user based on the user's authorization level. A developer can import the library of components, mark the library as a dependency, integrate components (e.g., styling, functionality, templating via html), create a small file (e.g., a JAVA SCRIPT®) to manipulate the data, and import the desired functionality from the library.

One example of a component is a login page component. A login page component can be used for multiple instances requiring a login page within one project, or can be used for login pages of different projects within a suite of projects. Here, even if different developers or different teams of developers are responsible for developing different parts of a project or different projects in a suite of projects, various login pages within the project or projects can look, feel, and function in a similar manner, since the same login page component can be used for all of the various login pages. In other words, the user will have a similar experience each time the user encounters a login page.

Top level and table navigation components are other exemplary components, which can be useful for systems content and entitlement management projects. For example, systems content and entitlement management projects can manage how systems are entitled, control access of content, security updates, and installing and removing packages. An entitlement may identify one or more computer systems (or the number of computer systems) licensed to consume specified digital content (e.g., a software package) under a subscription or a license. These components can be customized to include colors, logo, drop down menus and content. The developer should be able to create detail views or tables, or combine the detail views and tables with a few lines of code. For example, these components can also be customized to include an organization switcher which permits changes in context. The developer should be able to create detail views or tables, or combine the detail views and tables with a few lines of code. Here, an organization switcher component can be built from the more basic dropdown component and can be used to control the context of an application by providing an overarching scope on top of particular data. In one example, an organization switcher component can be used by larger companies that wish to break down their internal departments (e.g., business, IT, engineering) into organizations to facilitate isolation of allocated resources.

Another exemplary component utilizes two viewing panes to display data, e.g., from a database. Here, the user is automatically presented with an interaction pattern containing the desired data that is accessed by the component. In this example, a list of items is displayed on the left, and a summary or details of a selected item from the left is displayed on the right. The user can hover over an item in the list of items (e.g., a list of virtual machines) and click a particular item to get details about that item in right pane (e.g., status of a virtual machine). Further, based on the selection, the user can perform some action (e.g., deleting or starting a virtual machine). The user can also perform a search, where a search box will expand when selected and searching can be performed in the left pane. The user can then select the context where the searching (or filtering) is to be performed (e.g., a name or an IP address). When the user begins typing, searching begins in that context. Icon, such as status indication icons, can be displayed. In one example, a list of virtual machines can have icons showing status of each virtual machine, such as running or stopped. The table can be shrunk such that the list of items is in the left pane and details of a particular item, rather than data, is displayed in the right pane.

Managing accounts of cloud providers is an exemplary application. For example, a developer can develop an application to manage virtual machines across different cloud providers. The developer may want the management of virtual machines from different cloud providers to look and function similarly. However, different types of data may be provided by the different cloud providers. The developer can select suitable components that provide a unified appearance and functioning to provide a more unified experience for the user. For example, a user can select one of the cloud providers where the user has an account, login with the associated credential for that cloud provider account, and then view a display showing the virtual machines with that cloud provider. The user can then manage the virtual machines with that cloud provider account (e.g., create and delete virtual machines), and not have to contend with various permissions and visiting various pages to manage different cloud provider accounts.

Other examples of applications where component libraries according to embodiments can be useful include inventory management applications and client management applications.

Figure 3A:
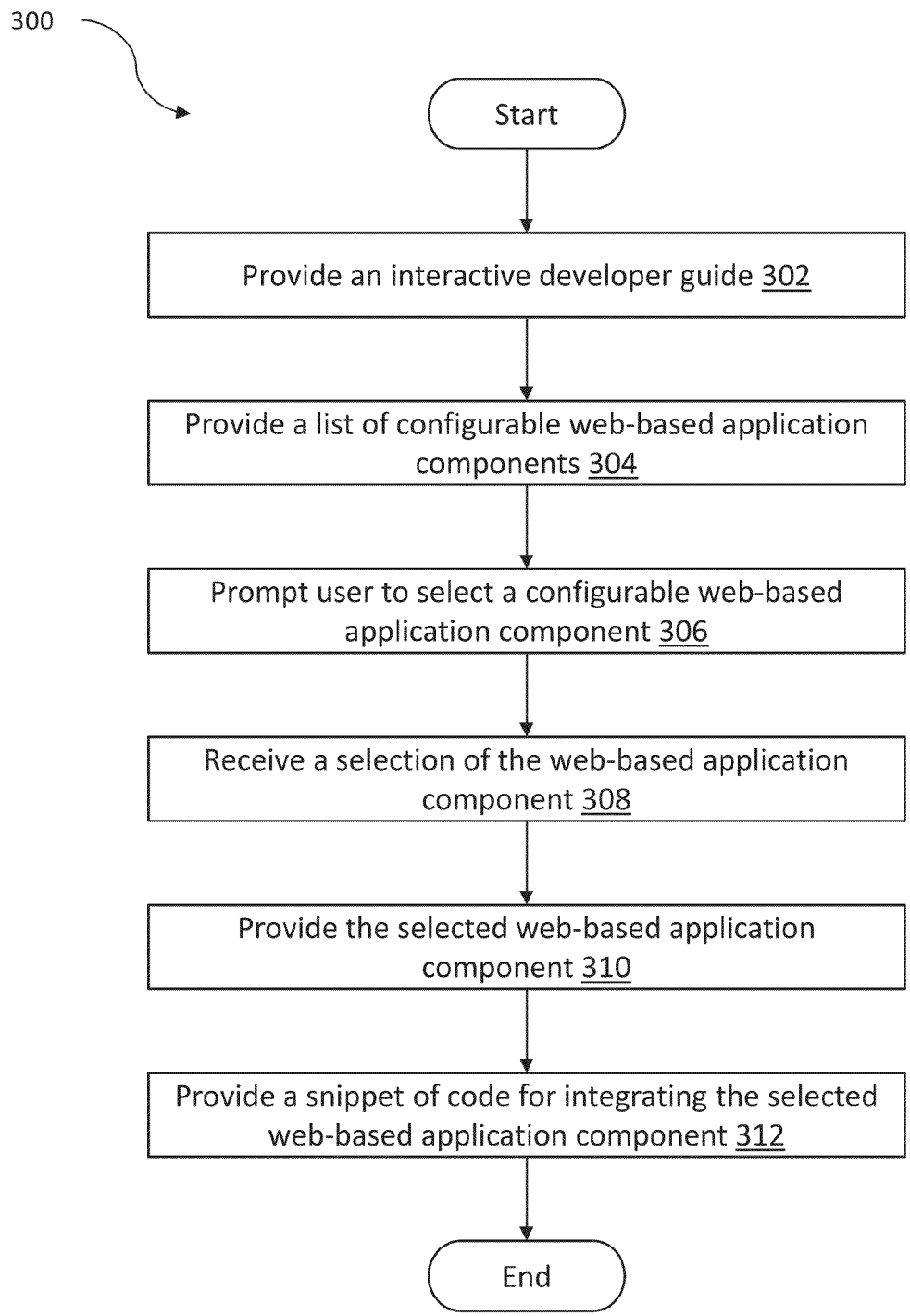
FIG. 3A illustrates a flow diagram of an embodiment of a method of providing a user interface library for building web-based applications according to one embodiment.

FIG. 3A illustrates a method 300 of providing a user interface library for building web-based applications according to one embodiment. The method 300 is performed by processing logic that may comprise hardware (circuitry, dedicated logic, etc.), software (such as is run on a general purpose computer system or a dedicated machine), or a combination of both. In one embodiment, the method 300 is performed by the developer guide system 210 of FIG. 2.

At block 302, an interactive developer guide is provided to a user (e.g., a developer). At block 304, the developer guide provides a list of configurable web-based application components, e.g., providing user interface components with certain functionalities such as buttons, context menus, dropdowns, toolbars, filter bars, headers, navigation, tables, forms, flash messages, sort by, and two-pane navigation.

At block 306, the developer guide prompts the user to select a configurable web-based application component. Here, the user can select one or more components that are suitable for a particular application. In one embodiment, the user can select multiple components at a time. In another embodiment, the user is prompted by the developer guide each time to select a component. In yet another embodiment, the user can be prompted to select a component from each of several different types of components. For example, the user may be prompted to select a login component from a list of different login components. The user can select the most suitable login component for the particular application. Next, the user may be prompted to select a navigation component from a list of different navigation components. The user can select the most suitable navigation component for the particular application.

At block 308, once the user has selected a component, the developer guide receives a selection of the component. At block 310, the developer guide can provide (e.g., display or provide a link to) the component to the user for use in the application. The component may represent a module in the form of, for example, a source code, a binary code, an executable, a script, etc. In one embodiment, more than one component can be provided, if the user has selected more than one component.

At block 312, the developer guide provides a snippet of code for integrating the selected component into the web-based application. The snippet of code can be constructed to allow the user to efficiently integrate the component into the application. In one embodiment, the user can customize or configure these components for the particular application. For example, the user can modify the snippet of code or the component. Configuration of the component can be merely integrating the component into the particular application, or configuration of the component can include substantial customization for the particular application or project.

Figure 3B:
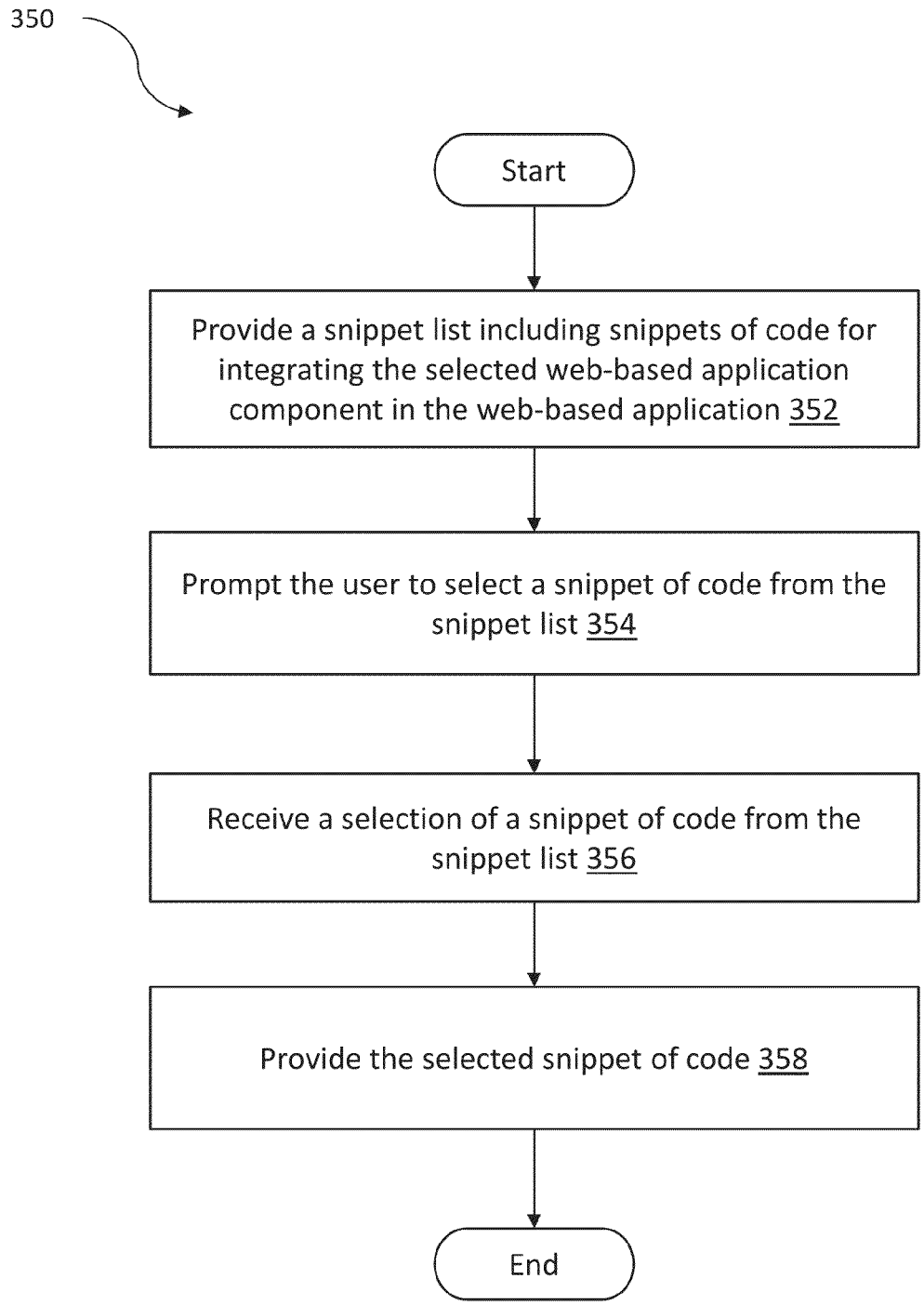
FIG. 3B illustrates a flow diagram of an embodiment of a method of providing snippets of code for integrating selected web-based application components according to one embodiment.

FIG. 3B illustrates a method 350 of providing snippets of code for integrating selected components into a web-based application according to one embodiment. The method 350 is performed by processing logic that may comprise hardware (circuitry, dedicated logic, etc.), software (such as is run on a general purpose computer system or a dedicated machine), or a combination of both. In one embodiment, the method 350 is performed by the developer guide system 210 of FIG. 2.

At block 352, the developer guide can provide a snippet list including snippets of code for integrating the selected web-based application component in the web-based application. For example, the snippet list can include a list of snippets of code that are optimized for use of the component in different types of applications. For example, one snippet of code from the snippet list can be optimized for use with a particular browser, while another snippet of code from the snippet list can be optimized for use with a different browser. In another example for components for use with databases, a snippet list can be provided to the user that includes different snippets of code that are optimized for different types of databases or databases containing different types of data.

At block 354, the developer guide prompts the user to select a snippet of code from the snippet list. At block 356, once the user selects a snippet of code, the developer guide receives the selection of the snippet of code from the user. At block 358, the developer guide provides the selected snippet of code to the user.

Figure 4A:
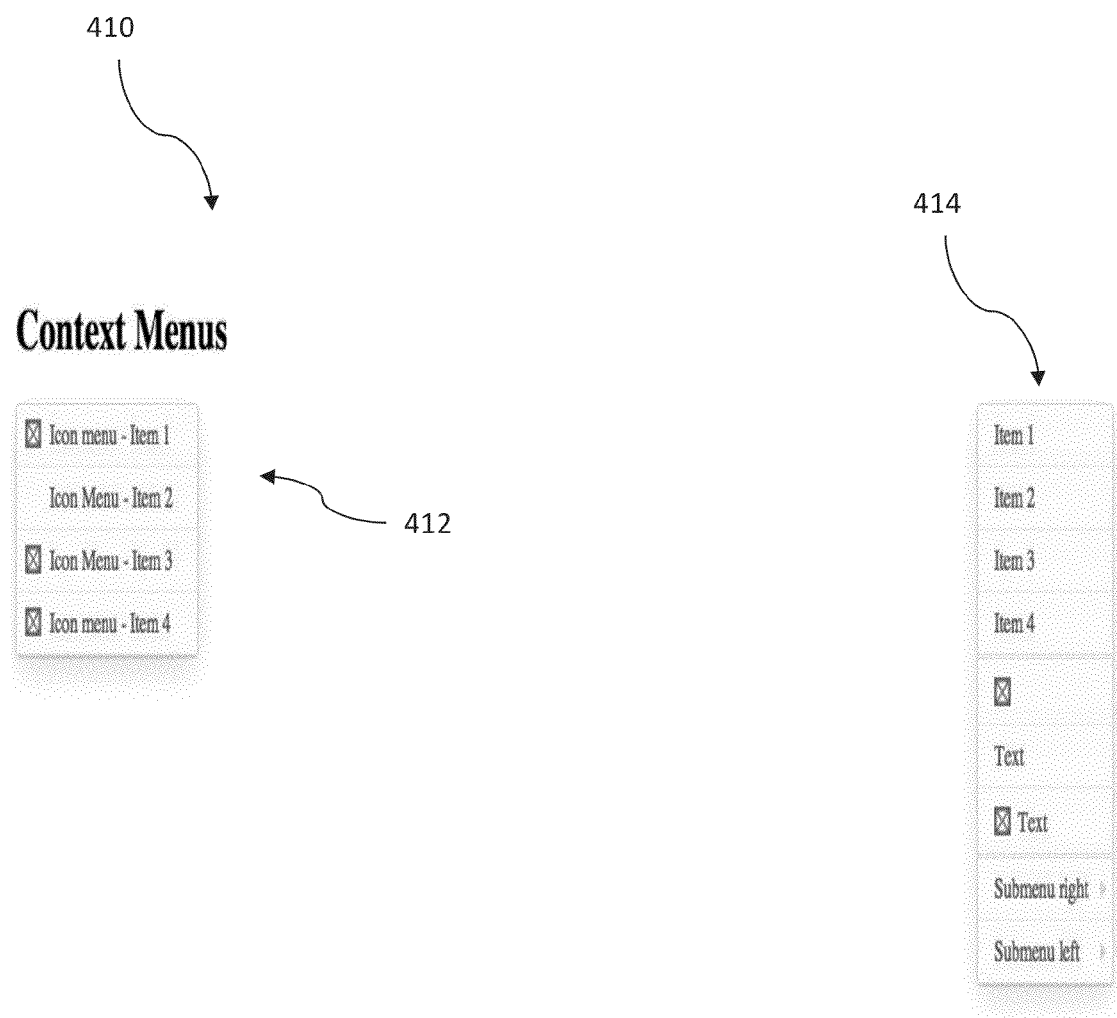
FIG. 4A illustrates a screen capture of a context menu component according to one embodiment.

FIG. 4A illustrates a screen capture 410 of a context menu component according to one embodiment. For example, the developer can modify the context menu component for use with a particular application by defining items such as Icon menu—Items 1-4 412, Items 1-4 and Submenus opening right and left 414, and/or modifying a number of items present. However, if this context menu component is used throughout a project by different developers, the context menus provided by this context menu component can provide a similar user experience for users because the context menus will have the same look and feel (e.g., same font, same colors, same spacing, etc.).

Figure 4B:
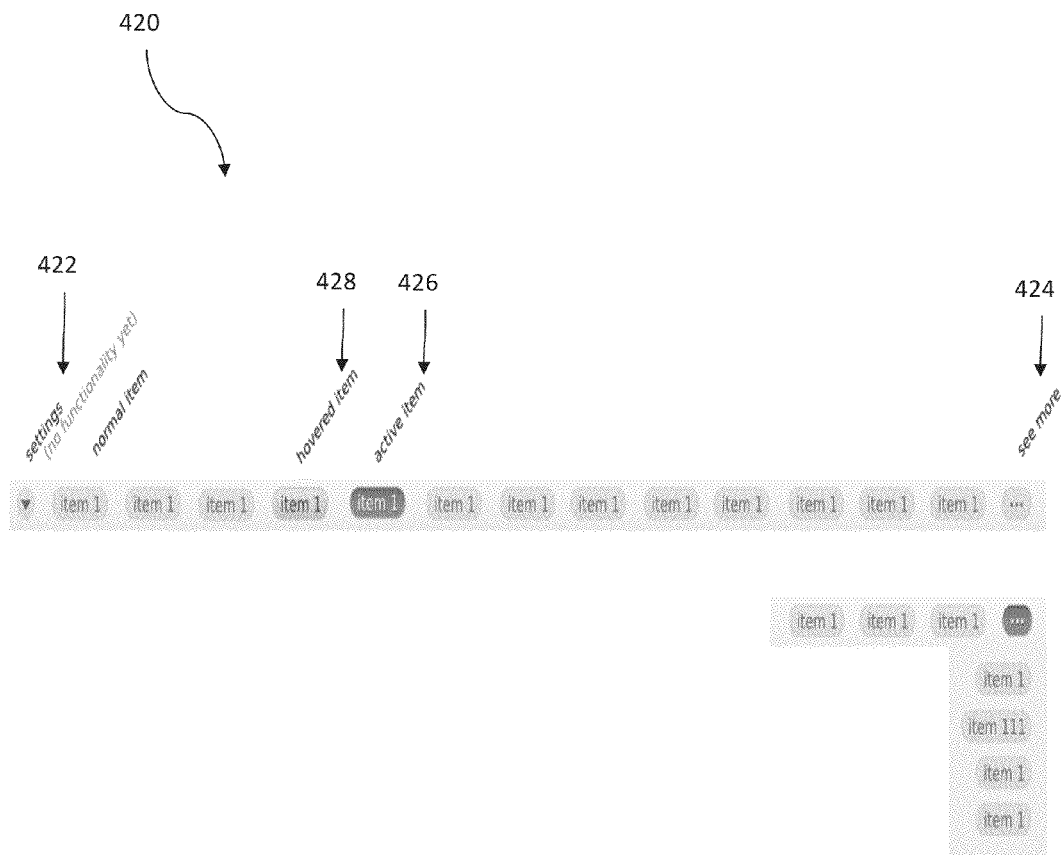
FIG. 4B illustrates a screen capture of a filter bar component according to one embodiment.

FIG. 4B illustrates a screen capture 420 of a filter bar component according to one embodiment. For example, the developer can modify the filter bar component for use with a particular application by defining items such as a settings selector 422, an item 428 that displays additional information when a cursor is hovered over it, a look of an active (or selected) item 426, a button 424 that causes more items to be displayed when selected, and/or modifying a number of items present. However, if this filter bar component is used throughout a project by different developers, the filter bars provided by this filter bar component will provide a similar user experience for users because the filter bars will have the same look and feel (e.g., same font, same colors, same spacing, same shape, etc.).

Figure 4C:
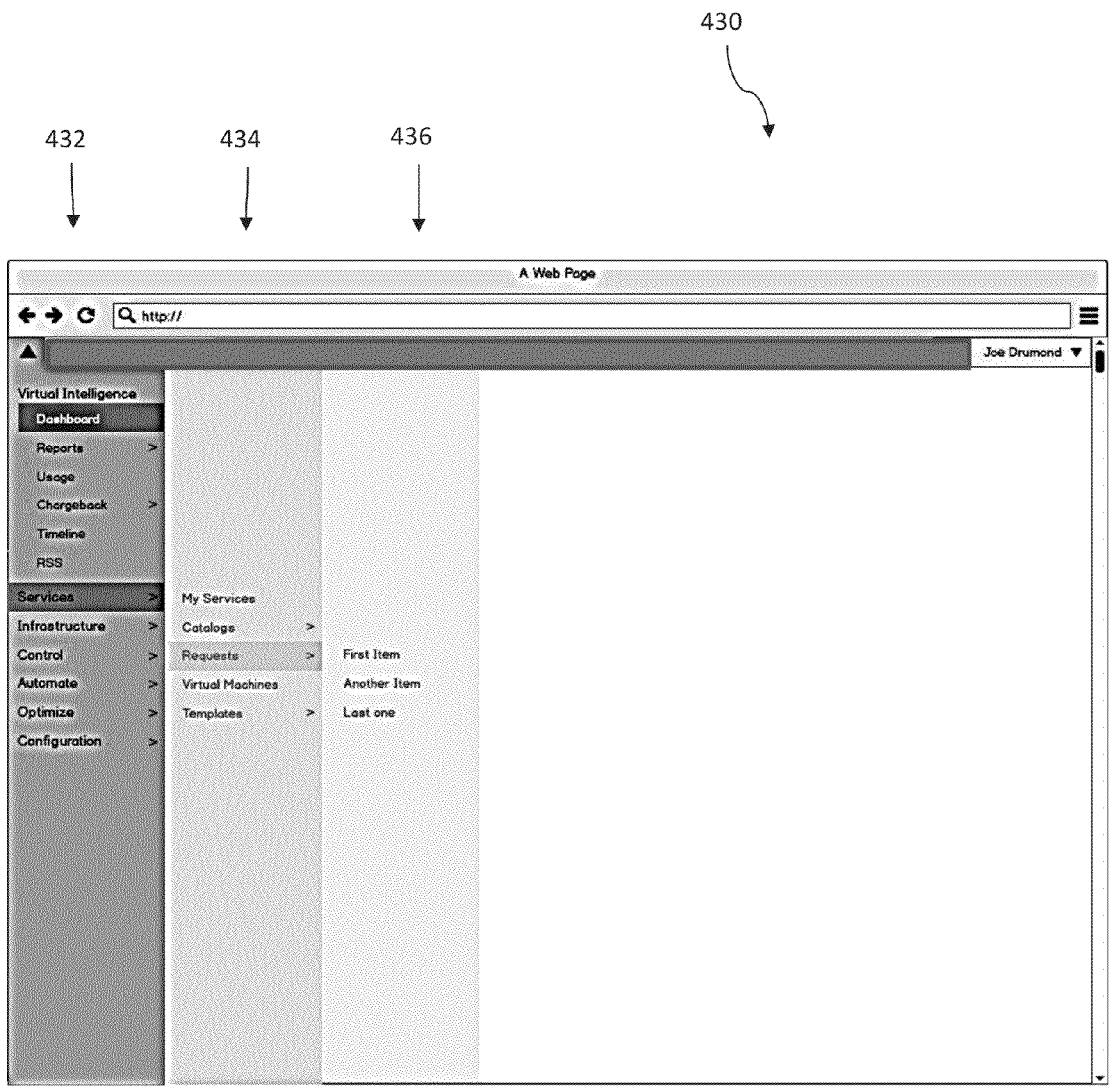
FIG. 4C illustrates a screen capture of a navigation component according to one embodiment.

FIG. 4C illustrates a screen capture 430 of a navigation component according to one embodiment. For example, the developer can modify the navigation component for use with a particular application by defining selections available in the navigation component, such as a top level list 432 (e.g., including Virtual Intelligence, Services, Infrastructure, Control, Automate, Optomize, and Configuration, etc.). In one embodiment, items in the top level list can be hovered over or selected to show sub-selections. The developer can also define sub-lists 434 available (e.g., as My Services including Catalogs, Requests, Virtual Machines, Templates, etc.) that are displayed when an item in the top level list 432 is selected or hovered over by a cursor. The developer can also define sub-sub-lists 436 available that are displayed when an item in the sub-list 434 is selected or hovered over by a cursor. However, if this navigation component is used throughout a project by different developers, the navigation provided by this navigation component will provide a similar user experience for users because the navigation components will have the same look and feel (e.g., same font, same colors, same spacing, same sub-selection display, etc.).

Figure 4D:
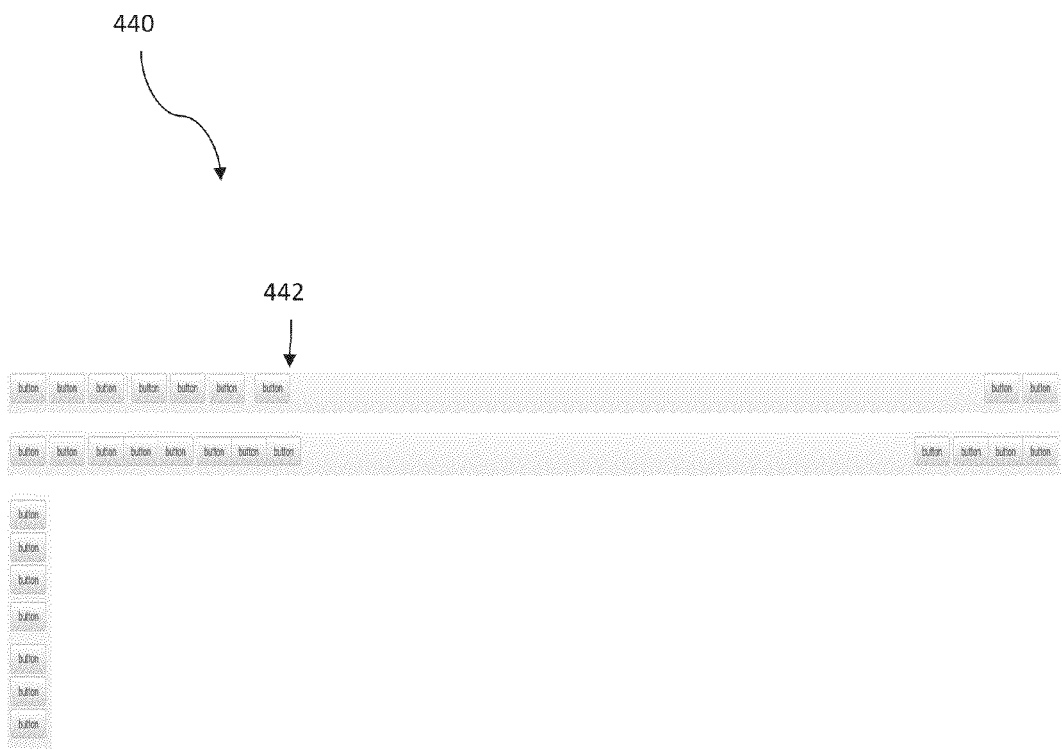
FIG. 4D illustrates a screen capture of a tool bar component according to one embodiment.

FIG. 4D illustrates a screen capture 440 of a tool bar component according to one embodiment. The developer can modify the tool bar component for use with a particular application by defining buttons 442, where selecting a button 442 performs a certain action. However, if this tool bar component is used throughout a project by different developers, the tool bar provided by this tool bar component will provide a similar user experience for users because the tool bars will have the same look and feel (e.g., same font, same colors, same spacing, same shape, etc.).

Figure 4E:
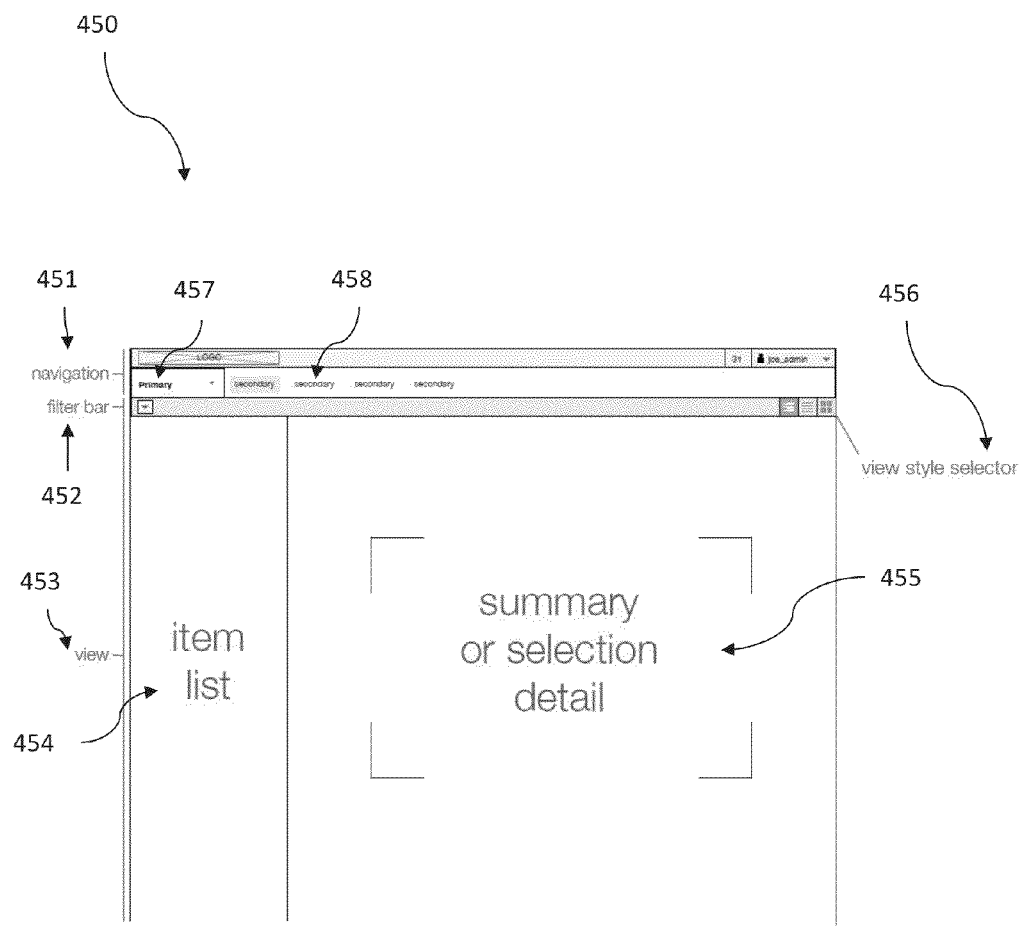
FIG. 4E illustrates a screen capture of a two pane view component according to one embodiment.

FIG. 4E illustrates a screen capture 450 of a two pane view component according to one embodiment. The developer can modify the two pane view component for use with a particular application by defining items in the navigation selector 451 (e.g., for selecting an environment for navigation), items in the filter bar 452, a view 453 of data, which can include an item list 454 in one pane and a summary or selection detail view 455 in another pane, etc. Further, a view style selector 456 can be defined to allow a user to select how data is displayed. However, if this two pane view component is used throughout a project by different developers, the two pane view provided by this two pane view component will provide a similar user experience for users because the two pane views will have the same look and feel (e.g., same font, same colors, same spacing, same shape, similar functionality and display of data, etc.).

Figure 4F:
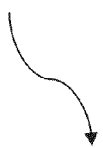
FIG. 4F illustrates a screen capture of an application with customized components according to one embodiment.

FIG. 4F illustrates a screen capture 460 of an application with a customized component according to one embodiment. Here, a menu component has been customized for use with a particular application. For example, the menu content needed by the application has been set (e.g., Dashboard, Content, Systems, etc.), the customized colors needed by the application have been set, and a custom element has been included for the application (e.g., ACME_Corporation, an organization switcher appearing in the upper left corner).

Figure 4G:
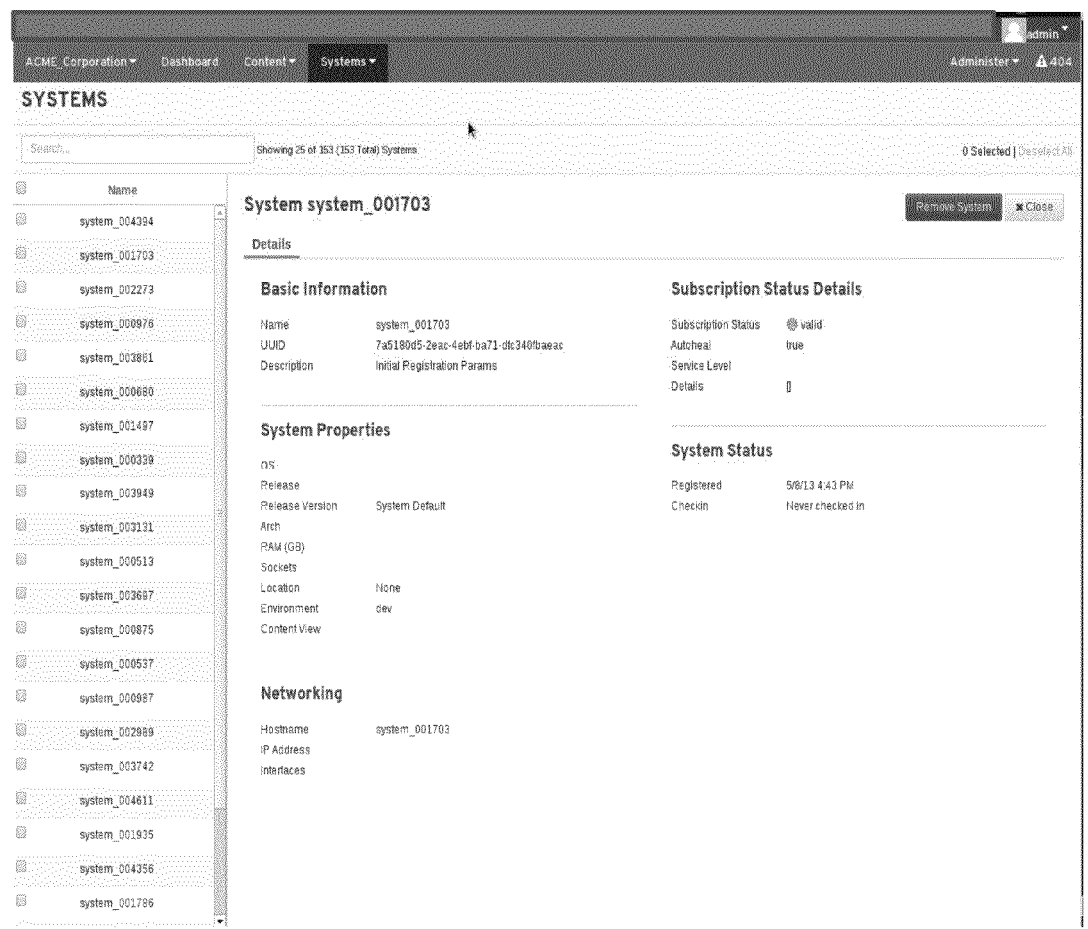
FIG. 4G illustrates another screen capture of the application with customized components of FIG. 4F according to one embodiment.

FIG. 4G illustrates another screen capture 470 of the application with customized components of FIG. 4F according to one embodiment. This view shows a two pane component with a full-page table implementation of system data displayed with a system list on the left with a detail view of single system information on the right and a toolbar for interacting with the table component above.

Figure 5:
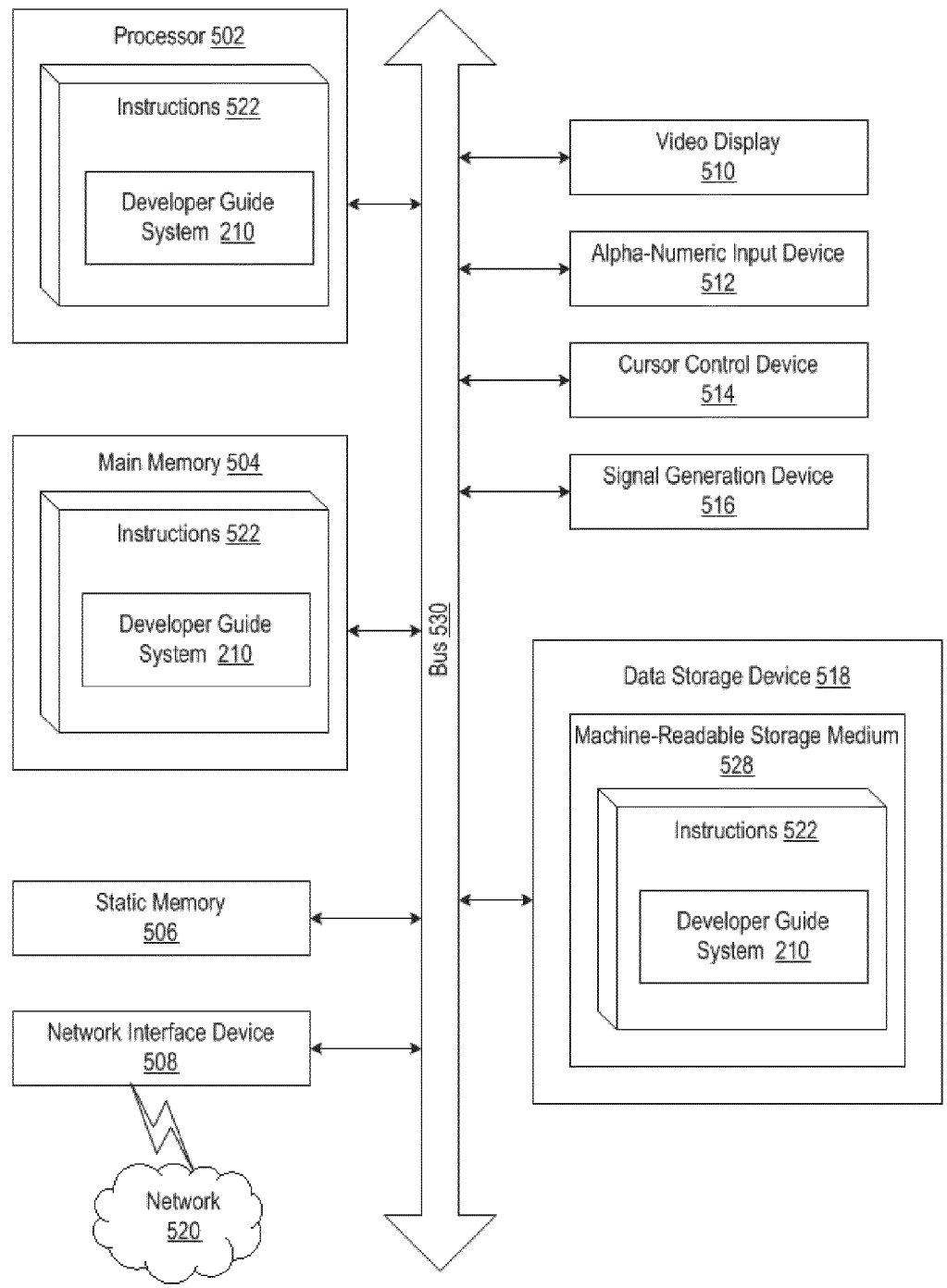
FIG. 5 illustrates a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a password system (e.g., developer guide system 210 of FIG. 2). While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   providing, by a processing device, a component list comprising a plurality of web-based application components to a user;
   prompting the user to select a web-based application component from the component list;
      receiving a selection of the web-based application component from the user, the web-based application component being configurable;
      providing the selected web-based application component; and
      providing, by the processing device, a snippet of code to integrate the selected web-based application component into a web-based application.

2. The method of claim 1 further comprising:
   providing a snippet list comprising a plurality of snippets of code including the snippet of code, wherein each of the plurality of snippets of code comprise snippets of code to integrate the selected web-based application component into the web-based application;
   prompting the user to select the snippet of code from the snippet list;
   receiving a selection of the snippet of code from the snippet list; and
   providing the selected snippet of code.

3. The method of claim 1, wherein prompting the user comprises providing a graphical user interface showing user selections.

4. The method of claim 1, wherein prompting the user comprises providing a graphical user interface showing available web-based application components listed by function.

5. The method of claim 1, wherein the plurality of web-based application components include at least one of: a form component, a table component, a login component, a button component, a filter component, a header component, a navigation component, a multiple viewing pane component, a menu component, a flash message component, tool bar component, and sorting component.

6. The method of claim 1, wherein prompting the user comprises selecting a web-based application component from each of a plurality of functionality types of web-based application components.

7. A system comprising:
   a memory; and
   a processing device operatively coupled to the memory to:
   provide a component list comprising a plurality of web-based application components to a user;
   prompt the user to select a web-based application component from the component list;
      receive a selection of the web-based application component from the user, the web-based application component being configurable;
      provide the selected web-based application component; and
      provide a snippet of code to integrate the selected web-based application component into a web-based application.

8. The system of claim 7, wherein the processing device is further to:
   provide a snippet list comprising a plurality of snippets of code including the snippet of code, wherein each the plurality of snippets of code comprise snippets of code to integrate the selected web-based application component into the web-based application;

prompt the user to select the snippet of code from the snippet list;

receive a selection of the snippet of code from the snippet list; and provide the selected snippet of code.

9. The system of claim 7, wherein to prompt the user comprises providing a graphical user interface showing user selections.

10. The system of claim 7, wherein to prompt the user comprises providing a graphical user interface showing available web-based application components listed by function.

11. The system of claim 7, wherein the plurality of web-based application components include at least one of: a form component, a table component, a login component, a button component, a filter component, a header component, a navigation component, a multiple viewing pane component, a menu component, a flash message component, a tool bar component, and a sorting component.

12. The system of claim 7, wherein to prompt the user to select a web-based application component comprises a graphical user interface with a plurality of functionality types of web-based application components.

13. A non-transitory computer-readable storage medium comprising instructions that cause the processing device to:

provide a component list comprising a plurality of web-based application components;

prompt the user to select a web-based application component from the component list;

receive a selection of the web-based application component from the user, the web-based application component being configurable;

provide the selected web-based application component; and provide a snippet of code to integrate the selected web-based application component into a web-based application.

14. The non-transitory computer-readable storage medium of claim 13, wherein the processing device further to:

provide a snippet list comprising a plurality of snippets of code, wherein each the plurality of snippets of code comprise snippets of code to integrate the selected web-based application component into the web-based application;

prompt the user to select a snippet of code from the snippet list;

receive a selection of the snippet of code from the snippet list; and provide the selected snippet of code.

15. The non-transitory computer-readable storage medium of claim 13, wherein to prompt the user comprises a graphical user interface showing user selections.

16. The non-transitory computer-readable storage medium of claim 13, wherein to prompt the user comprises a graphical user interface showing available web-based application components listed by function.

17. The non-transitory computer-readable storage medium of claim 13, wherein the plurality of web-based application components include at least one of: form components, table components, login components, button components, filter components, header components, navigation components, multiple viewing pane components, menu components, flash message components, tool bar components, or sorting components.

* * * * *